Aug. 7, 1962 — L. A. MARTIN — 3,048,846
METHOD FOR PROCESSING SEISMOGRAMS
Filed May 9, 1960 — 3 Sheets-Sheet 1
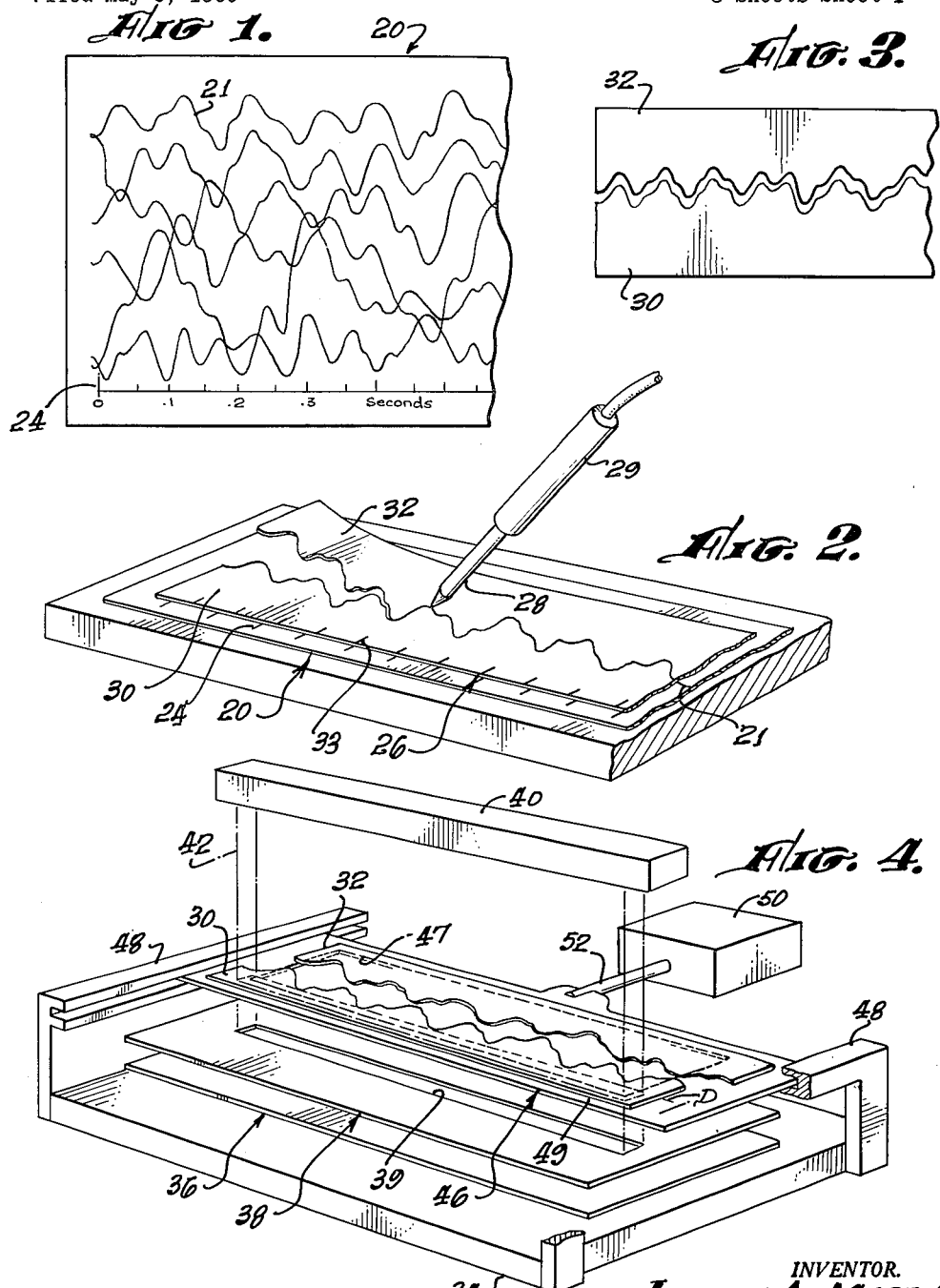

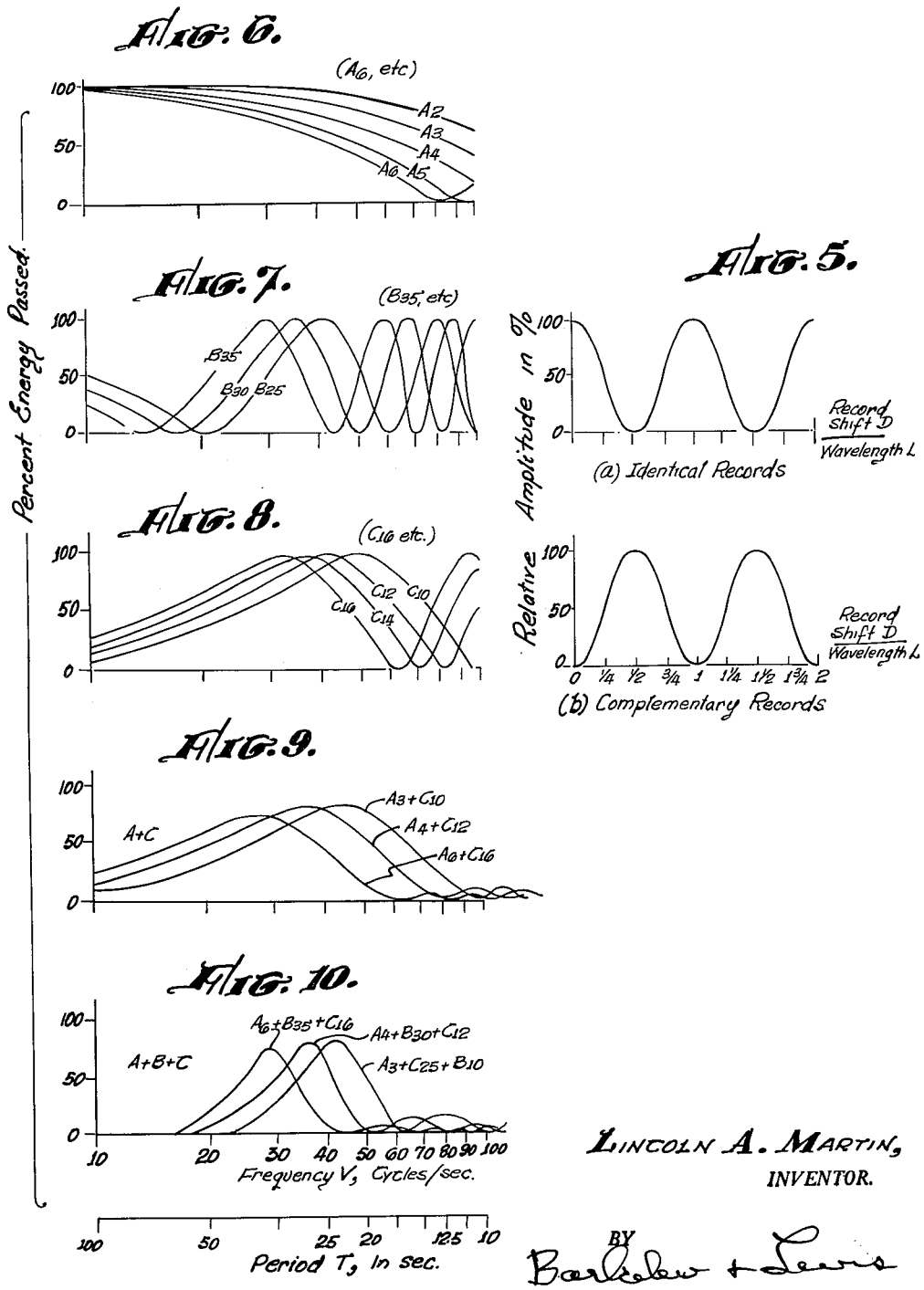

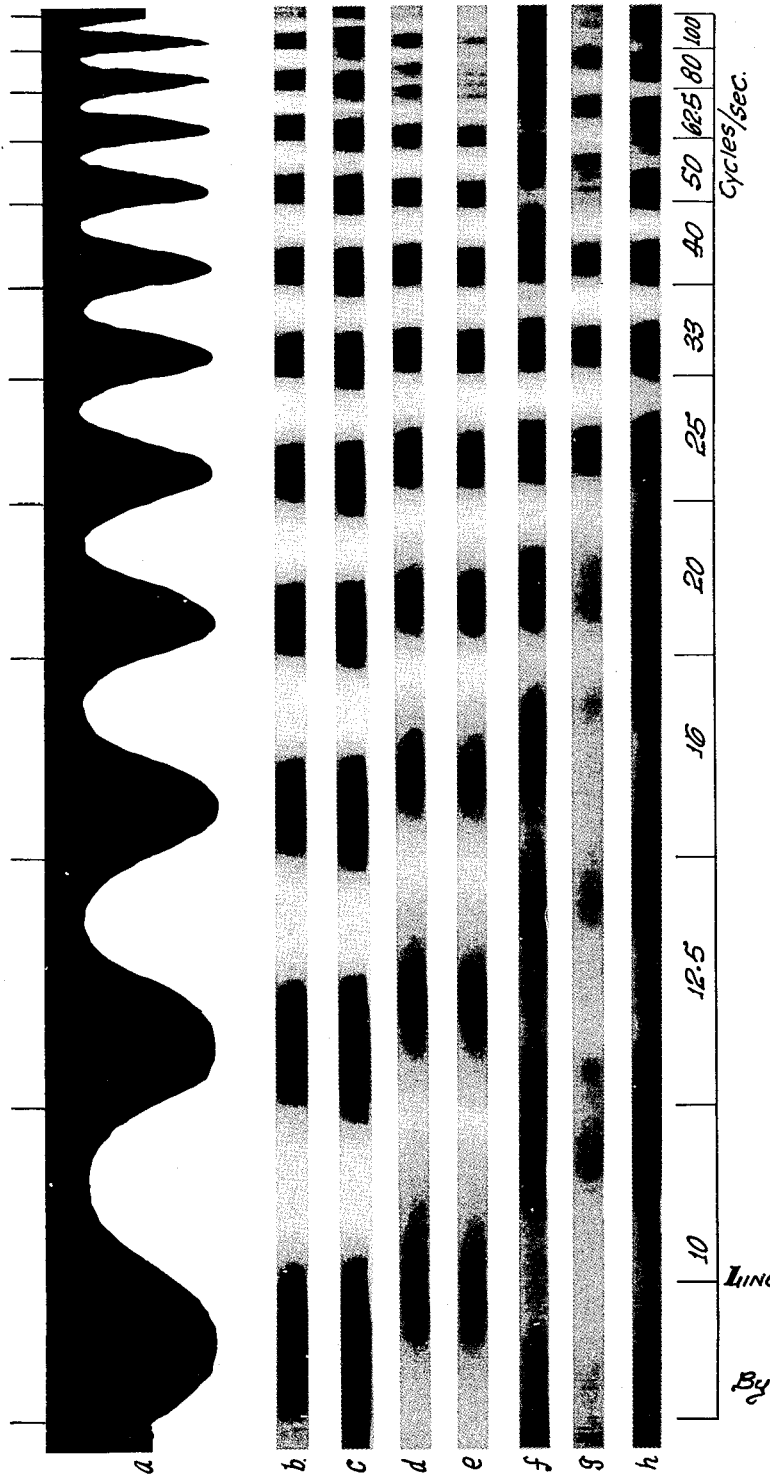

United States Patent Office 3,048,846
Patented Aug. 7, 1962

3,048,846
METHOD FOR PROCESSING SEISMOGRAMS
Lincoln A. Martin, 1305 Rubio, Altadena, Calif.
Filed May 9, 1960, Ser. No. 27,703
8 Claims. (Cl. 346—1)

This invention has to do with the processing of geophysical seismograms that represent vibrations reflected by earth strata from an explosive shot fired near the surface. More particularly, the invention concerns the conversion of such seismograms from one form to another; and the modification of such seismograms by filtering, whereby the relative intensity of various frequency components may be controllably varied.

Seismograms are commonly produced in two main forms. The glavanometer trace may be recorded directly, providing a graphical plot of ground movement as a function of time. As initially produced, such graphical trace records usually include many distinct but partially overlapping traces that represent echoes received at respective mutually spaced surface stations. The overlap of adjacent traces tends to make such records difficult to analyze.

In variable density seismograms, on the other hand, each station is represented by a narrow strip of photographic material in which the density is essentially uniform across the strip but varies longitudinally in accordance with the vibrations to be represented.

To facilitate interpretation of seismograms they are preferably corrected for static factors, such as differences in station elevation; and for dynamic factors, such as surface distances from the shot to the respective stations. The corrected records are then presented in variable density form, the records for the several stations being arranged in closely adjacent strips. Corresponding features then appear as transverse bands of light and dark across the assembly.

Many existing seismograms are now available only in the graphical trace form in which they were originally recorded. An important object of the present invention is to provide convenient and economical methods for converting such records to variable density form.

The value of such conversion is well recognized, and several systems have been devised for accomplishing it. Those systems, however, process the seismograms electrically, which involves such procedures as transferring to magnetic tape or scanning with a photoelectric cell. The necessary equipment for such operations is expensive to produce and to maintain. Moreover, conversion of the signals to electrical form sacrifices the convenience and flexibility that are inherent in visible operations.

Accordingly, a further object of the invention is to provide a method of converting trace seismograms to variable density form by procedures that are primarily mechanical and optical in nature and permit convenient and flexible control.

Such conversion is typically accomplished by tracing the individual curves of a galvanometer record on a transparent plastic sheet with a stylus heated above the melting point of the plastic. The sheet is thereby divided into two pieces which comprise variable area records, or profiles, that are mutually complementary. After coating with opaque material, such profiles are converted to variable density form by photographic printing in a manner to be described.

In accordance with a further aspect of the invention, the longitudinal scale of the record may be corrected in any desired manner during the described tracing of the record profiles. For example, the transparent sheet may be moved progressively relative to the original trace as the tracing is carried out. That movement typically corresponds to, and is controlled by, a suitable scale prepared in advance.

Many seismograms are made difficult to read by the presence of spurious signals. Such signals usually comprise frequencies either higher or lower than the range of primary interest. An advantage of the electrical procedures already referred to is that electronic filtering techniques are available for separating such spurious frequencies from those of interest.

An important feature of the present invention permits highly effective removal of spurious signals of either high or low frequency, or both, without the use of complex electronic equipment. Moreover, in preferred form of the invention, such filtering can be accomplished virtually without additional effort or expense while photographically converting graphical trace records to variable density form.

Such filtering is effected by summing two or more records with suitable mutual longitudinal displacement. That can be accomplished particularly conveniently and effectively during the transformation of a seismographic record from variable area to variable density form. In particular, during photographic reproduction of a record, filtering is introduced in accordance with the invention by exposing the photosensitive material to a plurality of partial exposures for which the respective images of the record are mutually displaced longitudinally. The multiple exposures may form two groups, made from respective records that are mutually complementary, one being essentially or precisely the reverse of the other.

The methods of the invention are also capable of performing such operations as mixing related records for enhancing the seismic data relative to random background noise.

A full understanding of the invention, and of its further objects and advantages, will be had from the following description of illustrative ways in which it may be carried out. The particulars of that description, and of the drawings which form a part of it, are intended only as a description, and not as a limitation upon the scope of the invention.

In the drawings:
FIG. 1 is a schematic plan representing a seismogram of graphical trace form;
FIG. 2 is a schematic perspective, representing an illustrative process step of the invention;
FIG. 3 is a schematic plan representing illustrative complementary records of variable area type;
FIG. 4 is a schematic perspective representing another illustrative process step of the invention;
FIG. 5 is a graph representing illustrative amplitudes resulting from summing two records with varying record shift, plotted as a fraction of the wavelength;
FIG. 6 is a graph representing illustrative amplitudes resulting from summing identical records with constant values of record shift, plotted as a function of frequency;
FIG. 7 is a graph similar to FIG. 6, but for larger record shifts;
FIG. 8 is a graph representing illustrative amplitudes resulting from summing complementary records;
FIG. 9 is a graph representing illustrative amplitudes resulting from summing identical records with two different shifts;
FIG. 10 is a graph representing illustrative amplitudes resulting from summing both identical and complementary records with a plurality of different shifts; and
FIG. 11 is a reproduction of an illustrative variable area record and a plurality of variable density records prepared from it with selected illustrative types of filering.

An illustrative galvanometer trace seismogram 20 is represented in FIG. 1, with a plurality of distinct but partially overlapping traces 21. The several traces typically show the data received at adjacent stations from the same shot. The common time scale for the records is indicated at 24. In accordance with one aspect of the present invention, each of the graphical traces 21 is first converted into a variable area profile. That is preferably done by laying a sheet 26 of transparent material having a low melting point over the trace seismogram, as represented schematically in FIG. 2. The particular trace 21 to be converted is then followed manually with a heated stylus 28, which may comprise, for example, the point of a small soldering iron 29. The stylus is heated to a temperature that exceeds the melting point of sheet 26, and cuts through the sheet along the line of the original trace 21. Sheet 26 is thereby cut into two pieces 30 and 32, each of which has an edge profile that corresponds in form to the original trace 21. One of those profiles is the reverse of the other, as shown best in FIG. 3. Such complementary records will be referred to for convenience as positive and negative records.

One or both of the profiles are then coated with paint, as by spraying, to make them opaque to light. A wide variety of plastic sheet materials may be used for making profiles 30 and 32. A particularly satisfactory material is polymerized vinyl acetate, such as that sold by Eastman Kodak Company under the trade name "Kodatrace." Such material melts smoothly at a convenient temperature and does not damage the original record being traced.

It is often desirable to vary the time scale of the several records during the described tracing operation, either to correct for static and dynamic differences, or to correct for irregularities in the original record caused by such factors as irregular drive of the record sheet past the galvanometer. Such corrections can be made at the same time that each record is transformed from trace form to variable area form. For that purpose the sheet 30 is progressively shifted along the longitudinal or time axis of the seismogram as each record is traced, the amount of shift being controlled to cause the desired degree of modification of the time scale. Such control can be obtained conveniently by initially marking on sheet 30 a corrected time scale, as indicated at 33; and then sliding sheet 30 longitudinally while tracing the record so that, as the tracing tool progresses longitudinally of record 21, scale 33 is maintained continuously aligned with scale 24 at the position of the tracing tool. The magnitude of time scale correction required at each point of the record typically depends in known manner upon such factors as the surface distance from shot to receiving station and the velocity of wave propagation in the ground, as explained, for example, in Seismic Prospecting for Oil, by C. Hewitt Dix, Harper Bros., 1952, pages 134 and 135.

For some operations only one of the profiles 30 and 32 is required, and the other may be discard. For other operations, particularly when the record is to be filtered to reduce the intensity of low frequencies, both profiles are utilized. An important advantage of the described method of making variable area profiles is that both the positive and the negative profiles are typically produced in the same operation.

If preferred, instead of tracing the respective galvanometer records directly, as indicated in FIG. 2, it may be convenient to employ a mechanical tracing mechanism, such as a pantograph, for example, whereby the scale of the record may be modified at the same time that the tracing is carried out. Opaque sheet material may then be used in place of the transparent sheet 26, and the positive and negative profiles do not require painting.

FIG. 4 represents schematically a typical method of preparing variable density records from the variable area profiles just described. A sheet of photosensitive material, such as ordinary photographic film or paper, for example, is represented at 36, supported on a suitable base 34. An apertured mask 38 is placed over sheet 36 so that its aperture 39 delimits a distinct relatively long and narrow area of the sheet for production of each individual variable density record. Sheet 36 is typically moved laterally relative to aperture 39 after printing of each record to define a closely adjacent area for printing of the successive record. Optical means of suitable type, represented schematically at 40, project a beam 42 of parallel light having a suitable elongated cross section to illuminate uniformly the entire area of aperture 39. Optical means 40 preferably include suitable mechanism, such as interchangeable neutral filters, for example, for controlling the intensity of the light.

A carriage 46 is mounted above mask 38 and is movable laterally as indicated schematically by the guide members 48. The vertical separation of mask 38 and carriage 46 from sheet 36 is exaggerated in FIG. 4 for clarity of illustration. Carriage 46 is typically provided with a flat supporting surface 49 in which there is an elongated aperture 47, corresponding in length to aperture 39 but typically considerably wider. The carriage is shiftable between positions in which the portion of surface 49 on each side of aperture 47 intercepts the entire light beam. When the carriage is moved at uniform speed between those positions aperture 47 acts as a shutter, exposing sheet 36. The speed of that carriage movement and the width of the opening, among other factors, determine the degree of exposure. That movement may be controlled manually, but is preferably driven by mechanical means, represented schematically at 50 and coupled to the carriage by the actuating rod 52. When a variable area profile is placed on carriage 46 with its profile edge projecting laterally into aperture 47, the effective width of the aperture is reduced at each longitudinal position in direct accordance with the width of the profile at that position. The amount of light transmitted to photosensitive sheet 36 during each pass of the carriage varies accordingly. After development of the photographic material, the density of the image therefore varies longitudinally of the record in accordance with the profile form.

It will be understood, without detailed explanation, that the contact printing process of FIG. 4 can be replaced, if desired, by projection printing, whereby the record on carriage 46 is imaged by an objective lens upon the photosensitive sheet 36.

As shown in FIG. 4, a positive profile 30 is mounted at one edge of carriage aperture 47, and the complementary or negative profile 32 is mounted at the other edge. The two profiles are spaced laterally by some definite amount, which is at least sufficient to avoid overlapping of the two profiles. The two profiles are mutually offset longitudinally by a suitable distance, represented at D, to produce the desired filtering action. With that arrangement the width of the opening and hence the degree of exposure of sheet 36 depend upon both the positive and negative records. The resulting exposure corresponds substantially to the exposure that would be obtained from two successive exposures made with two separate apertures of half the width of aperture 47 and with the positive profile mounted at one edge of one and the negative profile mounted at one edge of the other. Any difference in average aperture width when two profiles are mounted on the same aperture can be substantially compensated by suitable adjustment of the light intensity in beam 42. Any two variable area records can be thus mixed and converted to a variable density form by a single pass of carriage 46. That operation may be considered as comprising two exposures, carried out in rapid succession, or effectively simultaneously. Alternatively, each variable area record can be exposed by a separate pass of carriage 46. The edge of aperture 47 not occupied by that record may then accommodate a mask of any desired form, which may, for example, represent the negative of some particular undesired signal component that is to be removed from the record.

In actual practice the variable area records indicated at 30 and 32 in FIG. 4 need not be identical with the records produced in FIG. 2, but may be derived from the latter records in any desired manner. In particular, that derivation may introduce differential corrections in the respective records, such as the static and dynamic corrections already mentioned. If it is preferred not to make such corrections during the tracing step, they may be made, for example, by photographic printing of the initial variable area record on photosensitive film, the printing exposure being made progressively through a narrow transverse slit which is moved at uniform speed longitudinally of the record. In such a printing step, the required static correction can be applied by suitable initial longitudinal placement of each record; and the dynamic correction, which varies in magnitude longitudinally of the record, can be applied by moving the profile longitudinally by an appropriate amount as the exposing slit progresses along it. That movement may be driven automatically, if desired, by a cam mechanism in which the cam profile is suitably designed to produce the required correction in each instance.

In the record conversion process illustrated in FIG. 4, the entire exposure of film 36 may be made during one pass of carriage 46; or a plurality of passes may be made. The same total exposure may be obtained from the multiple exposures either by using a relatively higher carriage speed or by using a lower light intensity, for example. Such multiple printing exposures may be made with respective similar but not identical records, which are thereby combined into a single record. It is often useful to sum records corresponding to adjacent stations, for example, or records obtained at one station from successive shots, in order to average out accidental variations and enhance the true seismic data. An advantage of the present method is that such summing of records does not require a separate operation, but may be an integral part of converting the records from variable area to variable density form.

In accordance with a further aspect of the invention, such summing of like or complementary records may be carried out in such a way that it produces effective filtering of a record, for example to reduce or eliminate frequency components outside of the range of primary interest. Such filtering is done typically by means of a plurality of partial exposures made with the controlling record at different longitudinal positions relative to the photographic film. The type of filtering action can be varied over a wide range under accurate control by suitable selection of the relative record shift, and by using a complementary record for part of the partial exposures.

The seismograms represent pressure or movement variations as a function of time, and often exhibit wave formations that have a well-defined wavelength L as seen on the record. By reference to the time scale 24 of the record (FIG. 1), that wavelength on the record corresponds to a definite period T of oscillation of the actual wave, and hence to a definite wave frequency $V=1/T$. Even when waves are not clearly evident on the record, the record variations can properly be considered to comprise the combined effect of several or many components, each having a definite frequency and amplitude. Each such component, if present alone, would appear as a simple wave pattern; and the filtering action to be described has substantially the same effect on a given frequency component whether other frequencies are present or not.

When two like records are summed, for example, by the process of FIG. 4, with the records at respective longitudinally offset positions, the offset causes either addition or destructive cancellation of the various frequency components, depending upon the relation between the magnitude D of the offset and the wavelength L on the record corresponding to the frequency in question. Frequencies for which the displacement D is between 0 and ¼ wavelength, or between ¾ and 5/4 wavelength, are augmented, with maximum occurring at shifts of zero and one wavelength. On the other hand, frequencies for which the shift is ¼ to ¾ wavelength are diminished in amplitude, with maximum effect, typified by complete cancellation, at ½ wavelength.

When two complementary records such as 30 and 32 are summed, the opposite effects occur, with maximum diminution of the amplitude at displacements of 0 and 1 wavelength; and maximum augmentation at shifts of ½ wavelength. Increase of such displacements by an integral number of wavelengths does not affect the results.

The actual effects of such summing of longitudinally offset records are plotted for convenient reference in FIG. 5. Graph $a$ represents summing of two identical profiles; graph $b$ summing of two complementary profiles. The record displacement D is plotted horizontally as a fraction of the record wavelength L; and the resulting amplitude for that wavelength is plotted vertically as a percentage of that which would result from two similar exposures of the same record with zero displacement.

In FIG. 6 each curve shows the variation with frequency V of the percentage amplitude that results from two partial exposures of the same record with a specific value of record displacement D that is small compared to the vibration period T. The displacement value for each curve is given in milliseconds, and is preceded by the letter A for convenience or reference to this type of filtering. As the record displacement increases from 2 to 6 milliseconds, the attenuation of high frequencies becomes more pronounced. For example, the frequency corresponding to 50% attenuation shifts from about 120 to about 40 cycles per second.

FIG. 7 is like FIG. 6, but represents values of record displacement that are of the same order as the vibration periods shown, and are identified by the letter B for convenience of reference. The curve for 30 msec. shift, for example, shows two maxima of attenuation at frequencies of 16.7 and 50 cycles per second, at which $D=0.5T$ and $D=1.5T$, respectively. Between those values is a transmission band with maximum at 33.3 cycles, at which $D=T$.

FIG. 8 represents the results of summing a positive and a negative record. The four curves correspond to respective values of record displacement D, which are given in msec. preceded by the letter C for convenience of reference. Such summing of complementary records attenuates the low frequencies, with a first transmission maximum at $T=2D$.

FIGS. 9 and 10 represent the results of certain illustrative combinations of the summing operations A, B and C of FIGS. 7, 8 and 9, respectively. FIG. 9 represents combinations of specific record displacements of types A and C, the magnitudes of the respective shifts being indicated in msecs. as before. In making such filtering combinations four partial exposures are used, two exposures of the positive record with mutual shift of A msec.; and two exposures of the negative record with shifts of C msec. measured from the respective A positions. With the described photographic method of summing the two complementary records may be mounted as indicated in FIG. 4, with displacement D corresponding to the desired C shift. Only two carriage passes are then required for the four exposures. Combinations of type $A+C$ transmit a desired frequency band and effectively attenuate both the higher and lower frequencies.

As shown in FIG. 10, even sharper cut-off can be attained by including exposures with record displacements of all three types A, B and C. Such exposures typically comprise eight partial exposures; the four exposures of the $A+C$ operation being repeated with the B shift. The three illustrative combinations in FIG. 10 give sharp bands with peaks at approximately 40, 35 and 28 cycles per second.

Other combinations of filtering operations produce characteristic transmission patterns, permitting wide variation of the filtering action to suit special requirements. Also, the filtering process of the invention can be carried out, if desired, on records that are already in variable density form. That can be done, for example, by copying such records, if opaque, on transparent film, complementary records being made, if required, in the form of regular positive and negative photographic films. Those records may then be multiply printed with suitable mutual longitudinal displacement in the general manner described in connection with FIG. 4, except that lateral movement of the records may then be dispensed with and the degree of exposure controlled with a shutter of conventional type.

In its broader aspects, the invention may utilize any described type of summing procedure to produce filtering action of the described type. However, the preferred photographic procedure that has been described has the outstanding advantage that the filtering action is obtainable at the same time that the record is converted from variable area to variable density form.

The described filtering operations greatly enhance the seismic data, even when all partial exposures are made from a single record or from a single record and its complement, by eliminating or reducing the intensity of frequency components most likely to contain random noise. Further enhancement may be obtained, if required, by employing similar but non-identical records for the several partial exposures of the filtering procedure. Accidental variations having frequencies within the selected band are thereby attenuated at the same time that the frequency selection is accomplished.

FIG. 11 is a reproduction of an arbitrary variable area record, as well as a series of actual variable density records produced from its by the preferred procedure of the present invention with selected illustrative types of filtering. In FIG. 11, row $a$ is the variable area profile, which comprises 11 complete cycles of oscillation at respective arbitrarily selected frequencies, indicated in cycles per second. The selected frequencies embrace the range from 10 to 100 cycles, thus corresponding to that of FIGS. 6 to 10.

Row $b$ of FIG. 11 is a variable density record made photographically without any filtering from the variable area record $a$ by the general procedure described in connection with FIG. 4. Row $c$ shows a variable density record made with filtering of type A, with a record displacement of 4 msec. This record is closely similar to $b$ up to a frequency of about 40 cycles, beyond which the oscillations become progressively more attenuated. That action is in good agreement with curve A4 of FIG. 7.

Row $d$ of FIG. 11 was made with filtering of type C, using two partial exposures of complementary records with a displacement of 12 msec. It shows marked attenuation both above and below the peak transmission at 40 cycles, in agreement with curve C12 of FIG. 8.

Row $e$ of FIG. 11 shows combined filtering of types A and C, with shifts of 4 and 12 msec. respectively. The filtering action at low frequencies is closely similar to row $d$, but is more complete at higher frequencies, in agreement with curve $A4+C12$ of FIG. 9.

Rows $f$, $g$ and $h$ in FIG. 11 show selected combinations of all three illustrative types of filtering, and correspond directly to the three curves of FIG. 10. In all three records the attenuation actually obtained is remarkably effective at both high and low frequencies, and the transmitted band corresponds closely in frequency to the positions predicted by FIG. 10.

I claim:

1. The method of converting a graphical trace seismogram into a variable area seismogram with corrected time base, said method comprising superposing a sheet of meltable plastic material and the graphical trace seismogram, moving a heated stylus in contact with said sheet along a path that corresponds to the graphical trace to divide the sheet into respective positive and negative variable area records, relatively moving the sheet longitudinally of the graphical trace during said movement of the stylus, and controlling the magnitude of said relative movement to correct the time base of the records so produced.

2. The method of converting a graphical trace seismogram having an indicated time scale associated therewith into a variable area seismogram with corrected time base, said method comprising superposing a sheet of meltable plastic material and the graphical trace seismogram, providing a corrected time scale in fixed relation to the sheet, moving a heated stylus in contact with the sheet along a path that corresponds to the graphical trace to divide the sheet into respective positive and negative variable area records, and relatively moving the sheet longitudinally of the graphical trace to maintain the corrected time scale in alignment with the indicated time scale at the longitudinal position of the stylus.

3. The method of converting a graphical trace seismogram into a variable density seismogram having modified frequency characteristics, said method comprising moving a heated stylus in contact with a sheet of transparent metable material along a path that corresponds to the graphical trace to divide the sheet into respective positive and negative records, converting said records into opaque profiles, directing a light beam of elongated cross section and limited width upon a photosensitive surface, moving the profiles laterally across the light beam in opposed laterally spaced and longitudinally offset mutual relationship to control said exposure, and developing the exposed photosensitive surface.

4. The method of converting a graphical trace seismogram into a variable density seismogram having modified frequency characteristics, said method comprising forming opaque masks that correspond to the respective areas on opposite sides of said trace, directing a light beam of elongated cross section and limited width upon a photosensitive surface, moving the masks successively laterally across the light beam in longitudinally offset mutual relation to control said exposure, and developing the exposed photosensitive surface.

5. The method of producing from a first seismographic record a second record wherein the relative intensity of different frequency components is controlled, said method comprising subjecting an elongated photosensitive surface to a plurality of light exposures, controlling each exposure so that the degree of exposure varies longitudinally of the surface in accordance with said first record, and displacing the exposure variations of at least one of said exposures longitudinally of the surface relative to the corresponding exposure variations of another of said exposures.

6. The method defined in claim 5 and wherein the corresponding variations of said one exposure and said other exposure are substantially complementary.

7. The method of producing from a first seismographic record a second record, wherein the components having a predetermined wavelength are enhanced, said method comprising subjecting an elongated photosensitive surface to a plurality of light exposures, controlling each exposure so that the degree of exposure varies longitudinally of the surface in accordance with said first record, and displacing the exposure variations of at least one of said exposures longitudinally of the surface relative to the corresponding exposure variations of another of said exposures by a distance that substantially corresponds to that wavelength.

8. The method of producing from a first seismographic record a second record wherein the relative intensity of different frequency components is controlled, said method comprising deriving from the first record a record complementary thereto, subjecting an elongated photosensitive surface to a plurality of light exposures, controlling the exposures so that the degree of exposure varies longitudinally of the surface in accordance with the first said record for one pair of exposures and in accordance with the complementary record for a second pair of exposures, mutually displacing the corresponding variations of the exposures of the first pair longitudinally of the surface by a first definite distance, and mutually displacing the corresponding variations of the exposures of the second pair longitudinally of the surface by a second definite distance.

References Cited in the file of this patent

UNITED STATES PATENTS

| | | |
|---|---|---|
| 2,033,897 | Jenkins et al. | Mar. 10, 1936 |
| 2,444,327 | Baldwin | June 29, 1948 |
| 2,839,149 | Piety | June 17, 1958 |
| 2,916,724 | Peterson | Dec. 8, 1959 |
| 2,924,694 | Kreider | Feb. 9, 1960 |
| 2,956,261 | Grossling | Oct. 11, 1960 |